April 17, 1962 R. I. DINLOCKER 3,030,615
CONDITION INDICATING DEVICE FOR DRY-CHARGED BATTERIES
Filed Oct. 15, 1959
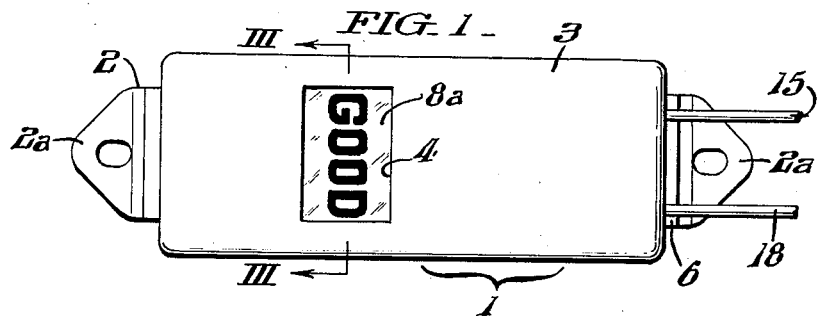
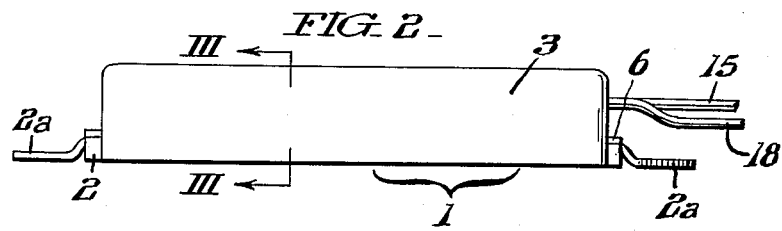
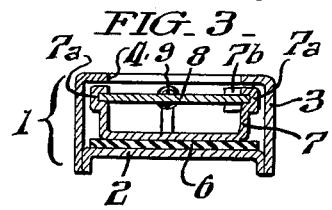
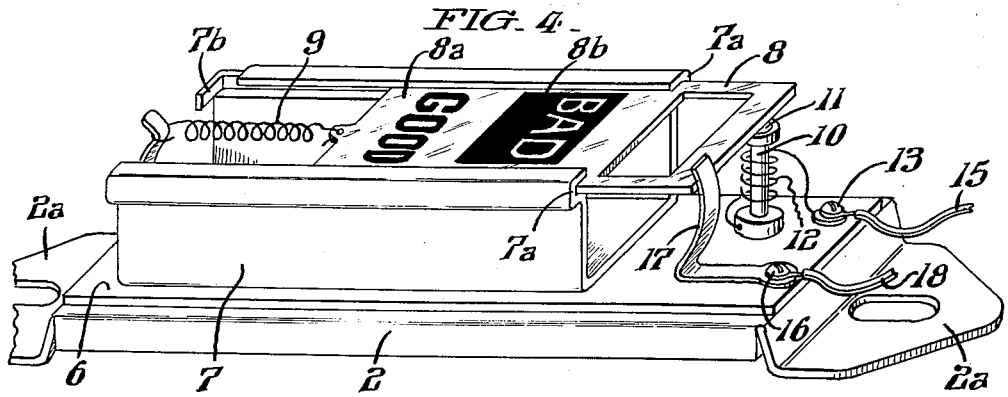
INVENTOR.
Robert I. Dinlocker;
BY Paul & Paul
ATTORNEYS.

United States Patent Office 3,030,615
Patented Apr. 17, 1962

3,030,615
CONDITION INDICATING DEVICE FOR
DRY-CHARGED BATTERIES
Robert I. Dinlocker, Lansdale, Pa., assignor to Electro Mechanical Instrument Co., Perkasie, Pa.
Filed Oct. 15, 1959, Ser. No. 846,625
2 Claims. (Cl. 340—249)

This invention relates to a condition indicating device for dry-charged batteries.

Certain types of dry-charged batteries become activated by bumping or jarring during shipment and storage. Once activated, they develop full voltage for a short period of time, and then deplete to zero voltage, even though no electrical load is imposed at the battery terminals, the batteries being then useless for any further application. When this happens it is impossible to detect a previously activated battery from one that has never been activated, since in both cases the terminal voltage is zero.

The chief aim of my invention is to provide a relatively simple, small and inexpensive device which is easily applied to the battery; which will indicate that the battery is in good condition as long as it remains in its dormant state; and which will operate automatically in the event that the battery becomes active, to give an indication to that effect.

Another object of my invention is to provide an indicating device having the above attributes which can be easily reconditioned for re-use.

Other objects and attendant advantages will appear from the following detailed description of the attached drawings, wherein:

FIG. 1 shows, in top plan, an indicating device conveniently embodying my invention.

FIG. 2 shows the device in side elevation.

FIG. 3 is a cross section taken as indicated by the angled arrows III—III in FIGS. 1 and 2; and FIG. 4 is a perspective view of the device drawn to a much larger scale with its cover removed to expose the parts at the interior.

As herein exemplified, the battery condition indicator of my invention has an elongate casing 1 of which the base 2 is fashioned from sheet material and may be of metal and is provided at opposite ends with depressed apertured ear prolongations 2a whereby the device can be attached, as by a strap or the like, to the battery (not illustrated). Engaged over the elevated portion of the base is a cover 3 having a window opening 4 in its top. A strip 6 of dielectric material overlaid upon the raised portion of the casing and suitably affixed thereto, is surmounted by a lengthwise extending channel section member 7 which is formed along opposite sides thereof, at the top, with grooves 7a for guidance of sheet metal slide 8, said slide being subject to the pull of a spring 9. Adjacent areas 8a and 8b of the slide 8 may be contrastingly colored and may have inscribed upon them the words "Good" and "Bad" as shown. Upstanding from and anchored in the dielectric strip 6 at one end is a metallic stud 10 having a soldered connection 11 at its top with the corresponding end of the slide 8 whereby said slide is normally held in advanced position against the pull of the spring 9 with the word "Good" appearing at the window 4 as in FIG. 1. Surrounding the stud 10 is a coil 12 of resistance wire whereof one end is connected to the base of said stud and the other end is connected to a screw 13 threaded into the insulation strip 6. By means of a lead 15, the screw 13 is adapted to be connected to one terminal of the battery. Secured to the insulation strip 6 by another screw 16 is a flexible metallic finger 17 of spring metal which normally bears against the end of the slide 8 adjacent the stud 10; and extending from said screw is a lead 18 which is adapted to be connected to the other terminal of the battery. The stop indicated at 7b serves to limit the retractive movement of the slide to the left.

Operation

As long as the battery to which the device is attached remains in a dormant state, the slide 8 will be held advanced as shown in FIG. 4 with the area 8a bearing the word "Good" exposed at the window 4 of the casing cover 3 shown in FIG. 1. In the event that the battery becomes active with attendant current flow through the leads 15 and 18, the coil 12 will be heated and cause the fusible solder 11 at the connection between the slide and the stud 10 to melt. As a consequence, the slide 8 will be released to the action of the spring 9 and be retracted, i.e. drawn to the left in FIG. 4 until arrested by the stop 7b when the area 8b of the slide bearing the inscription "Bad" will appear at the window 4. It is to be noted that the circuit from the battery through the leads 15 and 18 is interrupted as the slide 8 moves to the left away from the contact finger 17. Obviously, the device can be reconditioned for re-use with another battery simply by moving the slide 8 to its original position and re-soldering it to the post 10 at 11.

While in accordance with the provisions of the statutes, I have illustrated and described the best forms of embodiment of my invention now known to me, it will be apparent to those skilled in the art that changes may be made in the forms of the apparatus described without departing from the spirit and scope of the invention as set forth in the appended claims, and that in some cases certain features of my invention may be used to advantage without a corresponding use of other features.

Having thus described my invention, I claim:

1. The combination, with a dry charge battery, of a condition indicating device comprising a casing mounted with interposition of insulation upon a base plate, said casing having a window opening in its top; a slide guided for endwise movement in the casing having adjacent surface areas marked "Good" and "Bad"; a metallic stud, anchored in the insulation and fusibly connected at the top with one end of the slide, for normally restraining the slide against the pull of a spring with "Good" exposed at the casing window; a flexible contact finger normally bearing against the aforesaid end of the slide and electrically connected to a terminal in the insulation; and a coil surrounding the stud, one end of said coil being electrically connected to the stud and the other end thereof to another terminal in the insulation, whereby, upon connection of leads from an activated battery to the respective terminals, current will flow by way of the contact finger, the slide, the fusible connection the stud and the coil, with attendant fusion of said connection and release of the slide to the action of the spring for presentation of "Bad" at the window opening.

2. The invention according to claim 1, wherein the base has ears at opposite ends thereof for a strap by which the device is attachable to the battery.

References Cited in the file of this patent
UNITED STATES PATENTS
1,124,352 Stegemann et al. _____ Jan. 12, 1915
2,930,961 Lezan _____ Mar. 29, 1960